United States Patent [19]

Narcise

[11] 4,233,757

[45] Nov. 18, 1980

[54] MATHEMATICS DEVICE

[76] Inventor: Jacqualine Narcise, 1300 Delaware St., Berkeley, Calif. 94702

[21] Appl. No.: 939,364

[22] Filed: Sep. 5, 1978

[51] Int. Cl.³ .............................................. G09B 19/02
[52] U.S. Cl. ............................................. 35/73; 35/77
[58] Field of Search ................. 35/31 R, 31 A, 31 B, 35/31 D, 31 E, 31 F, 31 G, 33, 77, 73, 32

[56] References Cited

U.S. PATENT DOCUMENTS

| | | | |
|---|---|---|---|
| 342,737 | 5/1886 | Dougherty | 35/77 X |
| 422,612 | 3/1890 | Neuhaus | 35/33 |
| 1,233,544 | 7/1917 | Bissey | 35/33 X |
| 3,935,649 | 2/1976 | Harte | 35/31 D |

FOREIGN PATENT DOCUMENTS

| | | | |
|---|---|---|---|
| 608194 | 4/1926 | France | 35/33 |
| 290452 | 3/1964 | Netherlands | 35/31 F |

*Primary Examiner*—Harland S. Skogquist

*Attorney, Agent, or Firm*—Alvin E. Hendricson; William R. Piper

[57] ABSTRACT

A mathematics device in which 100 cubes are arranged in parallel rows with 10 cubes in each row and rotatably mounted on a supporting rod. A rectangular frame encloses all of the cubes and supports the rods. Each cube has four peripheral faces, each face having a different color and having numbers thereon for use in adding, subtracting, multiplying, dividing and improper fractions. Also, the two sides of the frame are numbered from 1 to 10 to represent the rows of cubes while the two ends of the frame are numbered from 1 to 10 and the cubes in each row are aligned under these numbers into ten columns. Spacing members are mounted on each rod and positioned between adjacent cubes and markers are provided to be removably mounted on the rods and between adjacent cubes and are used in solving various mathematical problems.

1 Claim, 6 Drawing Figures

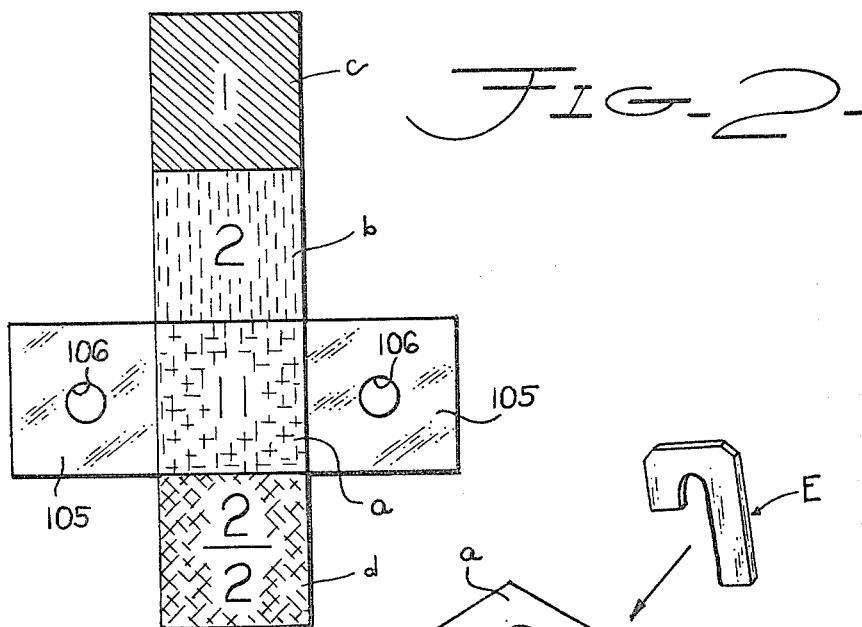
FIG-2-
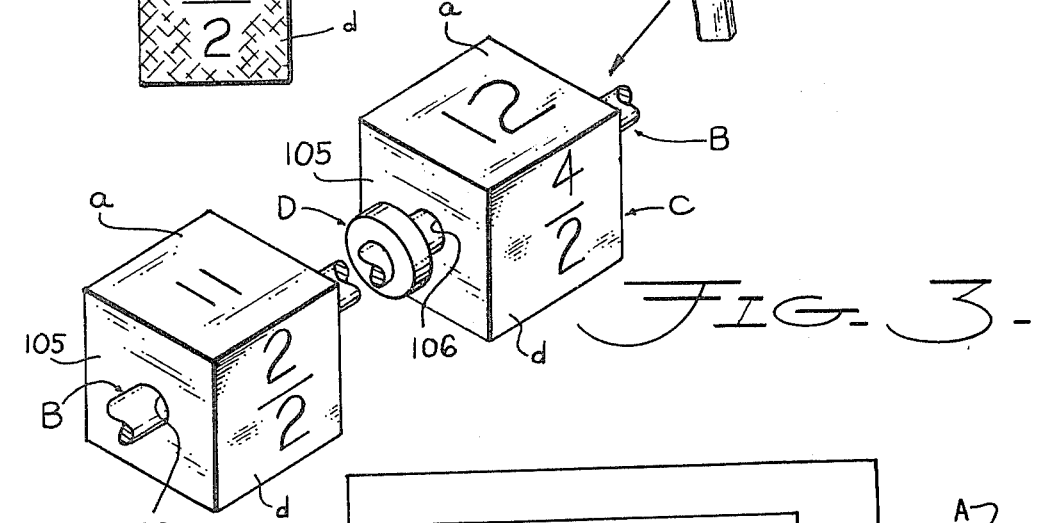
FIG-3-
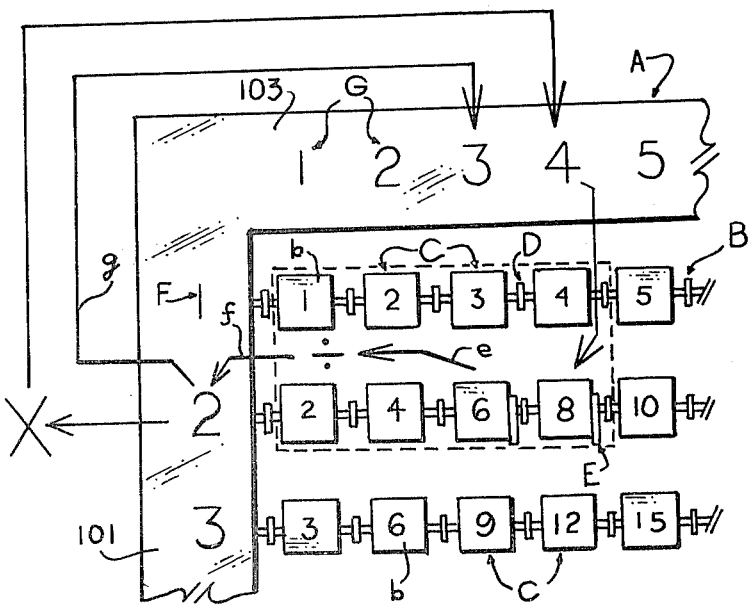
FIG-4-

MATHEMATICS DEVICE

SUMMARY OF THE INVENTION

An object of my invention is to provide a mathematics device that will visually aid children in learning to solve problems in addition, subtraction, multiplication, division and improper fractions. The 100 cubes are arranged in ten rows with 10 cubes rotatably mounted on each rod, the ends of the rods being mounted in the two sides of a rectangular frame. Each cube has four peripheral faces with different numbers of three of the faces and an improper fraction imprinted on the fourth face. The four peripheral faces are also in four different colors to aid the player in solving the problem. Markers are removably mounted on the rods to segregate different groups of cubes to visually show the person how the problem is to be solved.

BRIEF DESCRIPTION OF THE DRAWINGS

FIG. 2 is a development of one of the cubes illustrating the six sides. The four faces shown in a single line will form the four peripheral faces of the completed cube. The face (a) is colored yellow and when the 100 cubes in FIG. 1 are arranged to expose only their yellow faces, these faces will be numbered from 1 to 100, consecutively. The face (b) of the cube is colored purple and when the 100 cubes are arranged to expose only the purple colored faces, the numbers on the cubes in each row will be multiples of the number on the left hand cube such as 1, 2, 3, etc. for the top row; numbers 2, 4, 6, etc. for the second row and on up to 10, 20, 30 etc., for the bottom row.

The face (c) of the cube in FIG. 2 is colored green and the green faces on the 100 cubes are consecutively numbered from 1 to 10 on each of the ten rows. The face (d) of the cube is colored orange and the orange faces on the 100 cubes have improper fractions printed thereon. The numerator in the top row of the left hand cube is 1 and the denominator is 1, making the quotient 1. The next cube in the row is 2/1 and so on up to 10/1. In the second row the left hand cube with the orange colored face is marked 2/2 and so on up to 20/2. All of the other rows of cubes have their left hand cube representing an improper fraction up to 10/10 for the bottom row.

FIG. 3 is an isometric view of two of the cubes and illustrates the cube supporting rod on which the cubes are rotatably mounted and further shows the spacer placed between adjacent cubes and the marker which may be hung on the rod.

FIG. 4 is an illustration of a portion of the device with the cubes arranged to visually show the problems of division and multiplication being solved.

Figure 5:
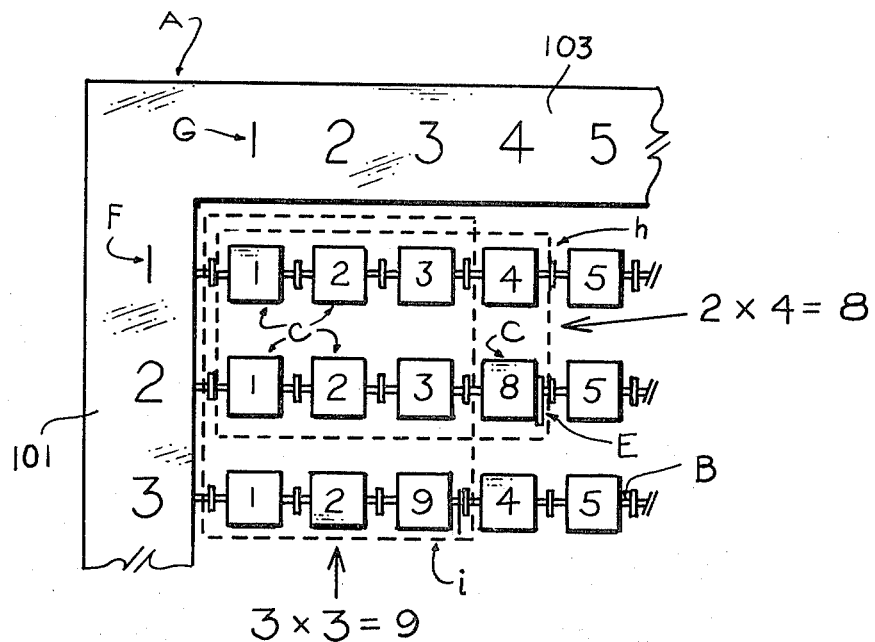

FIG. 5 illustrates problems in multiplication being solved and the use of the markers for indicating the correct answers.

Figure 6:
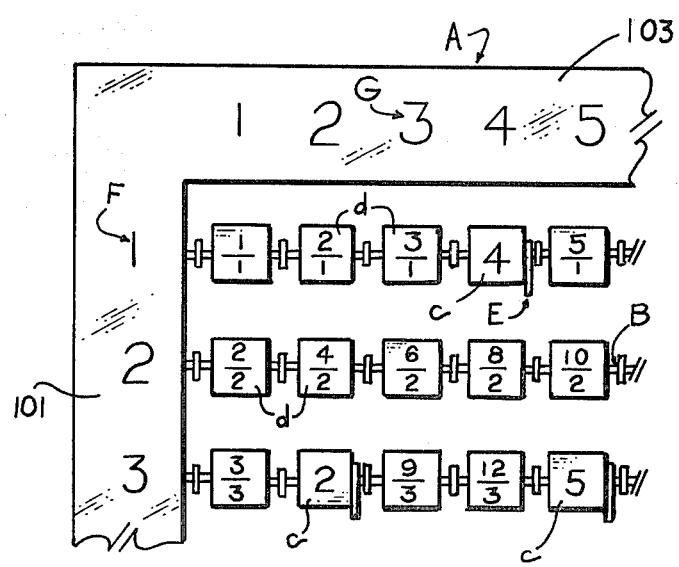

FIG. 6 shows the solving of a problem in improper fractions.

DESCRIPTION OF THE PREFERRED EMBODIMENT

Figure 1:
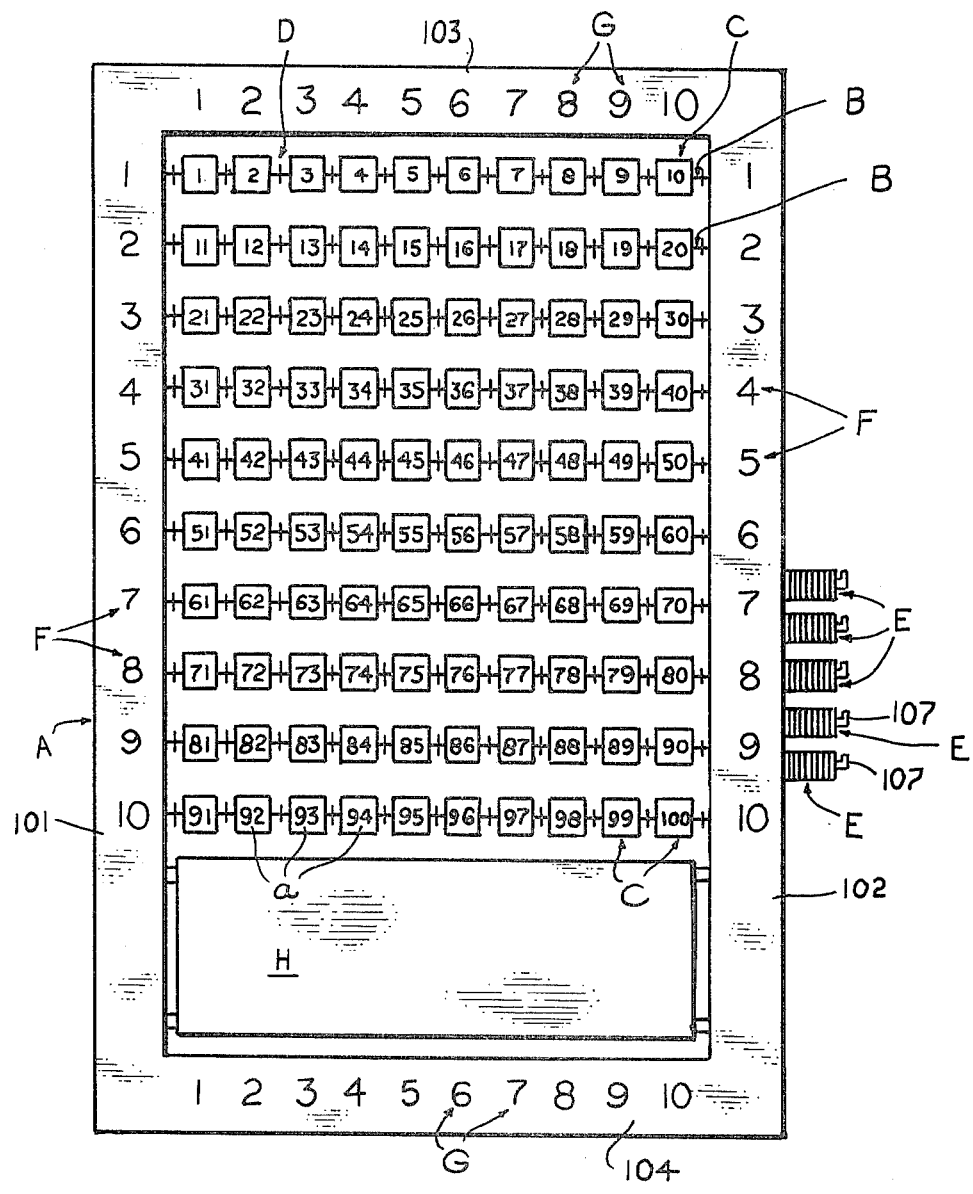
FIG. 1 is a face view of the mathematics device with the faces on the 100 cubes being numbered consecutively from 1 to 100. There are ten rows of cubes with ten cubes in each row. The two sides of the rectangular frame are numbered from 1 to 10 and correspond to the ten rows. The two ends of the frame are numbered from 1 to 10 and the cubes in the rows are arranged to form ten columns aligned with each of the ten numbers on the two frame ends.

In carrying out my invention I provide a rectangular frame indicated generally at A, in FIG. 1. The frame may be made out of any desired material such as plastic, etc. The frame has two side members 101 and 102 and two end members 103 and 104. A plurality of parallel rods B, have their ends secured in the side members 101 and 102 and these rods are illustrated by single lines in FIG. 1, although FIGS. 3 to 6 inclusive show the rods in proper form. Ten rods are shown in FIG. 1 and on each rod I individually and rotatably mount ten cubes C. This totals one hundred cubes.

Two of the cubes C, are illustrated in the isometric view of FIG. 3. Also, FIG. 2 shows a blank of one of the cubes. The side walls 105 of the cubes have a central opening 106 therein and the rod B, extends through these openings to permit the cubes to be rotated on the rods. Disc-shaped spacers D, are mounted on the rods and a spacer is positioned between each pair of cubes C.

Referring to FIG. 2, it will be seen that the other four walls of the cube C form the four peripheral surfaces of the cube. These four walls or surfaces have four different colors and they have different characters printed on them. The wall or surface (a), shown in FIG. 2 is colored yellow and it has the number 11 on it. There are 100 cubes shown in FIG. 1 and when all of these cubes have their yellow colored faces exposed to view, the top rows of cubes will be numbered consecutively from 1 to 10, the next row 11 to 20, and so on up to the last row which are numbered from 91 to 100. When the cubes C, are arranged in this manner, the mathematical device can be used for simple problems which will be described later.

The wall or peripheral face (b) of the cube C, shown in FIG. 2, is colored purple and it has the number 2 on it. When the purple faces of the cubes C, are all brought into view, the top row of cubes will be numbered from 1 to 10, the next row will be numbered in multiples of 2, such as 2, 4, etc., the third row will be in multiples of 3, such as 3, 6, 9 etc., and so on up to the bottom row which will be in multiples of 10, such as 10, 20, 30, etc. FIG. 4 shows a portion of the mathematical device with the cubes arranged in this manner. In addition, this showing of FIG. 4 will explain the simple problems of multiplication and division which will be mentioned later.

Another wall or peripheral face (c) is shown in FIG. 2, as being colored green. FIG. 5 illustrates a portion of the mathematical device where the cubes C are rotated to expose their green surfaces. It will be seen that each one of the rows will have their cube faces numbered from 1 to 10 consecutively. However, FIG. 5 also shows two problems in simple multiplication being shown and two of the cubes have been rotated to give the answer 8 in the second row and the answer 9 in the third row, both of which will be explained later.

The fourth wall or surface (d) of the cube C, is colored orange and this has the improper fraction 2/2 printed thereon in FIG. 2. When all of the 100 cubes have their orange surfaces brought into view, the top row of cubes, see FIG. 6, will have their improper fractions 1/1; 2/1; 3/1; etc., represent the quotients 1, 2, 3, etc. The next row of improper fractions 2/2; 4/2; 6/2; etc., will also represent the quotients 1, 2, 3, etc. In FIG.

6, two simple problems dealing with improper fractions have been solved and the answers are given by rotating the fourth cube in the top row to show the color green and by rotating the second cube in the third row to the same color. A more complete explanation will be given later.

As already stated, FIG. 1 shows all of the cubes C with their yellow faces (a) being visible. The cubes are numbered from 1 to 100 on their yellow faces (a). This face (a) of the cubes can be used for regular counting and for multiplication and division. The principles of addition and subtraction can also be demonstrated. For counting, the cubes C can be shifted slightly on their supporting rods B, to count a total of 100 objects or less. The student can actually see and touch 100 objects.

For solving a division problem when using the cubes as shown in FIG. 1, the principle of $36 \div 12 = 3$, can be worked out by starting with the number 36 in the fourth row and then count off 12 three times starting with cube marked 1. I show a plurality of markers E, of the shape shown in FIG. 3. A number of these markers E are supported on hooks 107 in FIG. 1 that in turn extend from the side 102 of the frame A. As the student counts off the three groups of 12 cubes each, he places a marker E on the rod B, in the second row after the cube face 12 and then places a second marker E after counting out the next group of 12 and this marker is placed after the cube face 24 in the third row of cubes. He will then view three groups of 12 by placing the third marker after the cube with the number 36 on its face.

For simple addition as for example $6 + 2 = 8$, the student can count six cubes C, in the top row in FIG. 1, and then add 2 by counting two more cubes and these would bring him to the cube whose face (a) is numbered 8. For simple subtraction such as $6 - 2 = 4$, the student would start with cube numbered 6 in the top row of FIG. 1, and mark off two cubes to the left and this would leave him to a cube whose face (a) has the number 4 thereon.

FIG. 4 further illustrates simple multiplication and division where numbers on the frame A, are also used. In FIG. 1, I show the two sides 101 and 102 of the frame with numbers from 1 to 10 and representing the ten rows of cubes C. These two columns of numbers on the two sides of the frame are designated at F. The two end members 103 and 104 of the frame A, also each has a row of numbers from 1 to 10 and these are referred to by G, in FIG. 1.

Referring again to FIG. 4, a portion of the frame A, is illustrated with the side 101 and the end 103 of the frame having the numbers F, and G, thereon. The purple face (b) of the cubes C, are brought into view by rotating the cubes on their supporting rods B. As already stated, when only the purple faces (b) appear the top row of numbers on the cubes will be from 1 to 10; the next row will start with 2 and the rest will be multiples of 2; and the third row will be 3, 6, 9 etc., or multiples of 3.

The simple problem of multiplication in FIG. 4 is $2 \times 4 = 8$. The student checks the number 2 in the column F of the frame side 101, and then checks the number 4 in the column G at the end member 103. He then lets his eye move along the row of cubes C in the second row until he comes to the cube with the number 8 that is in the column 4 under the number 4 in the row G. A marker E is placed adjacent the cube with the number 8 and this is the answer to the problem. The student has visualized his problem by looking at the cubes and the numbers in the frame A shown at F and G and also by counting eight cubes which are arranged in two groups of four cubes each.

The simple problem of division of $6 \div 2 = 3$ is likewise worked out by starting with cube numbered 6 in the second row and seeing that this cube is in the column designated 3 in the row G in the end frame member 103. The arrows e, f, and g point from the cube numbered 6 to the number 2 in the column F, and then point to the number 3 in the row of numbers G, on the frame A, or counting three groups of two cubes each which includes the cubes numbered 6 and 3, 4 and 2 and 2 and 1, in the second and first row of cubes shown in FIG. 4.

Referring to FIG. 5, there is shown two problems of simple multiplication where the column of numbers F, and the row of numbers G, are used in solving the problems. The green faces (c) of the cubes C are used for these problems and each row of cubes is similarly numbered from 1 to 10, consecutively. The multiplication of $2 \times 4 = 8$, the student starts with the number 2 in the column F, and then finds the number 4 in the row G. The cube E that lies at the intersection of the row 2 and the column 4 has the number 8 on its green face (c) and this is the answer. A dot-dash rectangle (h) encloses the two groups of four cubes each that are used in the solving of this problem. The same problem of $2 \times 4 = 8$ can be solved by counting the first four cubes in the first and second rows of cubes in FIG. 5, the answer being given by the right hand cube in the second row which is numbered 8.

The other simple multiplication problem of $3 \times 3 = 9$ is further shown in FIG. 5. In this instance, the student takes the third row of cubes marked 3 in the column F, and then takes the third column of cubes underlying the number 3 in the row G. The intersection of these two numbers 3 will be the third cube in row 3 and this cube is rotated to show its purple face (b), and on this face will appear the number 9 which is the correct answer to the problem. A dot-dash rectangle (i) groups the three rows of three cubes each which will aid the student in visualizing his problem.

FIG. 6 shows the cubes C rotated so as to show their faces (d) which are colored orange. The mathematics device may now be used in solving simple improper fractions. As already stated, when all of the cubes show their purple faces, the top row will show the cube faces 1/1; 2/1; 3/1; etc. The second row of cubes will be 2/2; 4/2; etc., and the third row will be 3/3; 6/3; 9/3; etc. Take the simple improper fractions of $12/3 = 4$, or $6/3 = 2$, and have the student visualize his solving of the problem. In the first problem, $12/3 = 4$, the student locates this improper fraction in the third row and further notes that it is in the fourth column under the number 4 in the row G. The answer to the problem will be given by the green face (c) of the cubes in which each cube in each row is numbered consecutively from 1 to 10. The fourth cube C in the top row lies in the same column as the number 4 in the row G, and when this cube is rotated to show its green colored face (c), the number 4 appearing on this face will provide the answer as to the value of the improper fraction $12/3 = 4$. A marker F could be placed on the rod 3, and adjacent to this cube. The same number 4 would appear on the fourth cube in row 3 bearing the improper fraction 12/3, when this cube was rotated to show its green colored face (c) which would have the number 4 imprinted thereon. FIG. 6 further shows the second cube in row 3 rotated to show its green face (c) to give the answer 2 to the improper fraction 6/3 appearing on the orange colored face (d) of the same cube. The fifth cube in the row 3 is another example of giving the number 5 on the green colored face (c) as the correct answer to the improper fraction 15/3 appearing on the orange colored face (d) of the same cube. Other examples could be given but this seems sufficient to illustrate the various mathematical problems that can be visually solved by the student.

It is possible to provide the frame A in FIG. 1 with a black board H, on which various problems may be written by using chalk.

I claim:

1. A mathematical device comprising:
   (a) a rectangular frame having two side members and top and bottom members;
   (b) ten parallel rods spaced apart and having the ends thereof supported by said frame side members;
   (c) ten cubes mounted on each rod and being individually rotatably mounted on the rod, each cube having four peripheral faces with one of the faces on each cube in a row being consecutively numbered from 1 to 10; a second face on each cube in the top row being consecutively numbered from 1 to 10; and the second row consecutively numbered from 11 to 20, and so on to the tenth row which is consecutively numbered from 91 to 100;
   (d) a third peripheral face on each cube in the first row being consecutively numbered 1 to 10, and in the second row being numbered in multiples of 2 from 2 to 20, in the third row being numbered in multiples of 3 from 3 to 30, and so on up to the tenth row where each third face of the ten cubes is in multiples of 10 from 10 to 100;
   (e) a fourth face on each cube in the first row being consecutively numbered with improper fractions of 1/1; 2/2 and up to 10/1; while the fourth face on the ten cubes in the second row have improper fractions from 2/2 to 20/2 and so on up to the tenth row having improper fractions from 10/10 to 100/10;
   (f) the frame side members having numbers from 1 to 10 representing the ten rows of cubes and at least one of the top and bottom frame members being numbered from 1 to 10 representing ten columns of cubes
   (g) a plurality of spacers mounted on each rod with a spacer disposed in fixed position longitudinally of the rod between adjacent cubes on each rod; and
   (h) markers removably mounted on said rods and being used in solving various mathematical problems.

* * * * *